United States Patent [19]
Thoeny et al.

[11] Patent Number: 5,459,374
[45] Date of Patent: Oct. 17, 1995

[54] COMBINATION FIXED SEGMENT AND ACTIVE MATRIX VACUUM FLUORESCENT DISPLAY

[75] Inventors: Michael B. Thoeny, Noblesville; John M. Dikeman; Alireza F. Borzabadi, Carmel, all of Ind.

[73] Assignee: Delco Electronics Corporation, Kokomo, Ind.

[21] Appl. No.: 270,876

[22] Filed: Jul. 5, 1994

[51] Int. Cl.$^6$ .................................................. G09G 3/10
[52] U.S. Cl. .................................... 315/169.1; 315/169.3; 315/169.4
[58] Field of Search ............................ 315/169.1, 169.3, 315/169.4; 313/495, 496, 283, 505

[56] References Cited

U.S. PATENT DOCUMENTS

| | | | |
|---|---|---|---|
| 4,719,389 | 1/1988 | Miesterfeld | 315/169.1 |
| 4,859,912 | 8/1989 | Lippman et al. | 315/169.3 |
| 5,099,178 | 3/1992 | Bozzer et al. | 315/169.1 |
| 5,151,652 | 9/1992 | Troxell | 315/169 |
| 5,155,413 | 10/1992 | Bozzer et al. | 315/169.1 |
| 5,177,406 | 1/1993 | Troxell | 315/169.1 |
| 5,345,141 | 4/1995 | Moyer et al. | 313/495 |

OTHER PUBLICATIONS

"MOS-addressed VED Character Display Incorporating Static RAM", Masahiro Yoshimura, Katsumasa Fujii, and Shin'ichi Tanaka, Sashiro Uemura, Makoto Horie, 1985 SID International Symposium, Digest of Technical Papers, pp. 362–365, 1985.

"High-Resolution VFD On-a-Chip", Masahiro Yoshimura, Katsumasa Fujii, Schin'ichi Tanaka, 1986 SID International Symposium, Digest of Technical Papers, First Edition, pp. 403–406.

Primary Examiner—Robert J. Pascal
Assistant Examiner—Haissa Philogene
Attorney, Agent, or Firm—Jimmy L. Funke

[57] ABSTRACT

A single glass envelope contains fixed anode segments on the glass surface and a silicon substrate mounted on the same surface. The silicon substrate contains an active matrix vacuum fluorescent anode array as well as serial interface circuitry and a driver circuit for each of the AMVFD and the fixed segment display to minimize the number of input pins in the lead frame of the envelope. Aluminum traces on the glass surface are wire bonded to the substrate and extend to the fixed segments and to the lead frame pins.

5 Claims, 2 Drawing Sheets

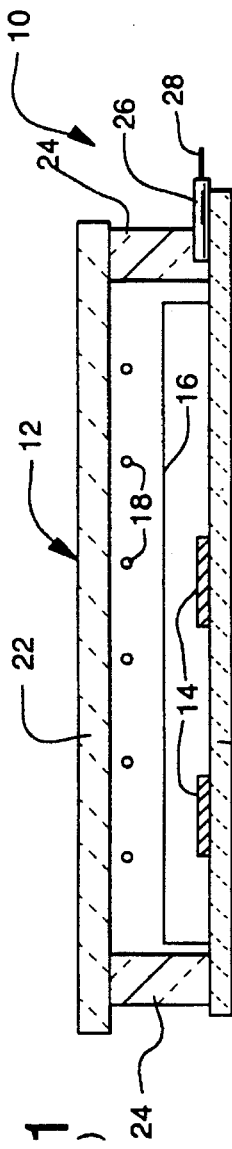
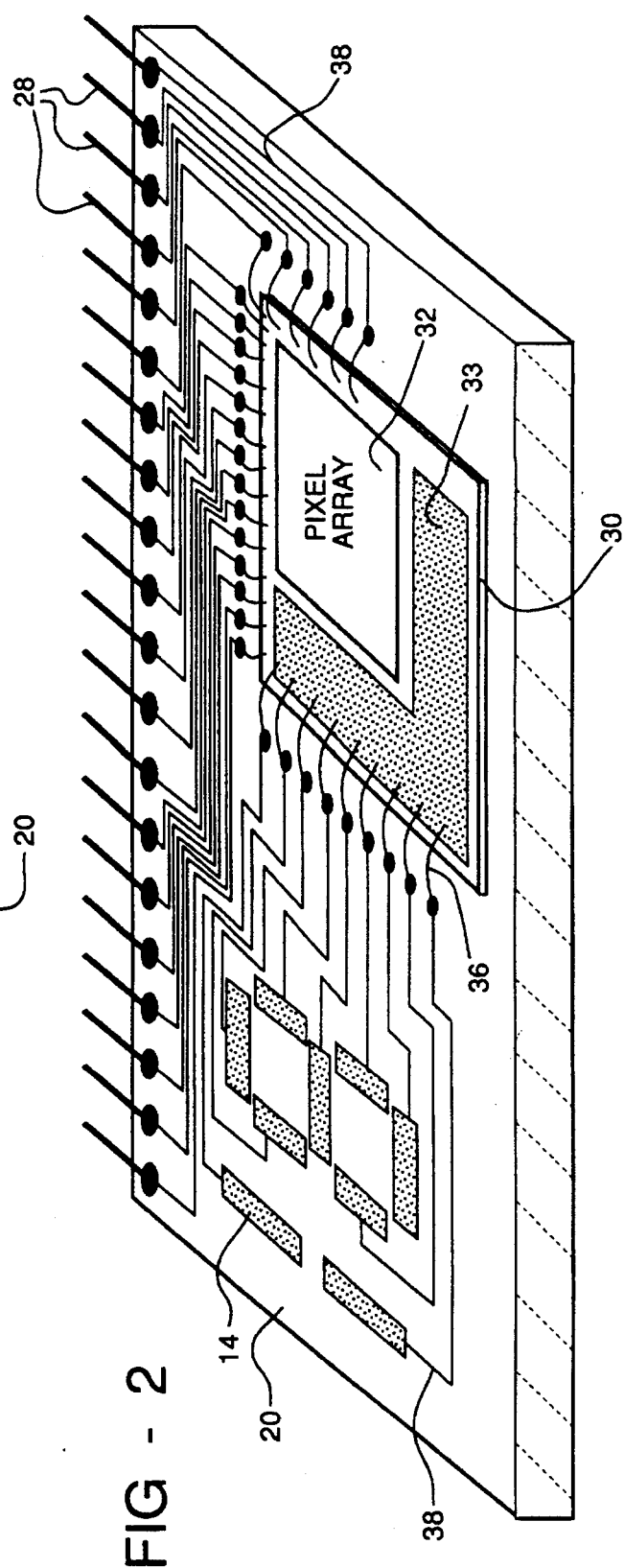
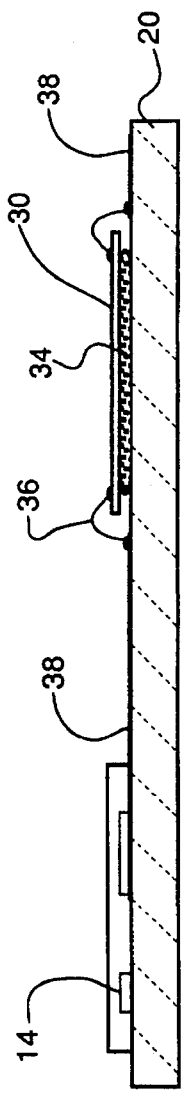
FIG - 1 (PRIOR ART)
FIG - 2
FIG - 3

COMBINATION FIXED SEGMENT AND ACTIVE MATRIX VACUUM FLUORESCENT DISPLAY

FIELD OF THE INVENTION

This invention relates to vacuum fluorescent displays and particularly to such a display having both a fixed anode segment portion and a reconfigurable display portion.

BACKGROUND OF THE INVENTION

Automotive vehicles often use vacuum fluorescent displays (VFDs) as instrumentation for providing vehicle speed and other information to the operator. The display is housed in a vacuum tube having a lead frame defining pins connected to various anode portions. In external control circuitry, typically speed data, various switch states, fuel level, dimmer control, and other digital or analog information is fed to a microprocessor which determines which anode portions should be illuminated to convey the information in an orderly manner. Many outputs are then coupled from the microprocessor to the pins via drivers which supply the required voltage level for the desired illumination intensity.

Generally such VF displays use fixed segment anodes to display graphic data. Each anode sement, which comprises one of the individual graphic segments when activated, is connected via a lead frame pin of the VFD the the external control circuitry which is physically separate from the display. This control circuitry is effective to impose the correct "on" voltage on each anode segment to be illuminated and an "off" voltage on the remaining segments. Such fixed segment displays are generally dedicated to specific information, so that a large array of such displays would be required to afford all the information which might be desirably provided to the operator. In the case of direct viewing of the display, limitations in instrument panel space prohibits such expanses of display area. Moreover, when the display is used in conjunction with a head up display (HUD), very small displays are required to minimize the HUD package size. A limiting factor in VFD package size reduction is the number of lead frame pins for connection to the outside circuit device. In practice, the anode segments are multiplexed (and thus less bright) to reduce the number of VF driver outputs required and/or to reduce the number of pins to keep the package size smaller.

To show a large amount of information in a small display space it has been proposed to utilize a reconfigurable display which is capable of revealing several types of information on a time sharing basis. It is known to use conventional dot matrix displays for this purpose but these have had limited brightness due to multiplexing requirements. Heretofore such displays have driven by pinning out each row and column of the array to a lead frame for connection to external driving circuitry. Each row or column uses two pins so that, for example, a 40×64 pixel array requires more than 200 pins, thereby limiting size reduction attempts.

An improvement over the conventional dot matrix display in terms of brightness is the active matrix vacuum fluorescent display (AMVFD) which includes a silicon substrate containing pixel and display multiplexing circuitry. By sending the appropriate data to the device data lines and power supply lines, the pixels on the device are turned on or off. A variety of reconfigurable graphics such as characters, numbers, ISO symbols, map data, etc. can be displayed. The construction of such AMVFDs comprises an evacuated glass envelope having a mounting surface bearing the silicon substrate and conductive traces extending across the mounting surface from the substrate to a lead frame which affords connections to external circuitry. Wire bonds couple the conductive traces to the silicon substrate. Filaments necessary to VFD operation are also included within the envelope. Self standing grids are not needed since a coplanar grid on the anode surface is employed. Details of such displays are disclosed in the papers "MOS-Addressed VFD Character Display Incorporating Static RAM", Uemura et al, SID 85 Digest, 362 and "High-Resolution VFD On-a-Chip", Yoshimura et al, SID 86 Digest, 403, which are incorporated herein by reference. Disadvantages of the AMVFD are the high cost of the silicon substrate and the need for individual pins for each row and column, as in the conventional dot matrix display. It is desirable, however to obtain the advantages of the AMVFD in a smaller size and at a lower cost.

SUMMARY OF THE INVENTION

It is therefore an object of the invention to take advantage of the brightness and reconfiguration properties of the active matrix VFD while minimizing the cost of the resulting display. Another object is to combine fixed segment and active matrix VFDs in the same envelope to secure the advantages of each technology. Another object is to reduce the number of pins required for connection to external circuitry, thus allowing the display size to be reduced.

The objects of the invention are met by combining fixed segment and active matrix displays within a single envelope, and by including control and driving electronics in the envelope. To minimize the number of pins coming out of the VFD, as well as to minimize the interface electronics required outside of the VFD, the AMVFD silicon substrate contains the necessary circuitry to drive the pixels of the dot matrix display as well as the fixed segment anode display segments which are on the glass envelope surface. The interface to the outside of the VFD is therefore simplified, since the same data transmission scheme used for AMVFD pixels may be used with the fixed segment anodes, minimizing cost and package size. The package size is reduced by the smaller number of pins required on the lead frame. Also, the fixed segment area would not need to be multiplexed since segments are not required to be pinned out to the lead frame of the VFD package. Aluminum traces on the glass surface extend from the periphery of the silicon substrate to pins on the lead frame as well as to the fixed anode segments, and wire bonds connect bonding pads on the substrate to the traces.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross section of a vacuum fluorescent display;

FIG. 2 is an isometric view of a lower glass substrate of a vacuum fluorescent display supporting fixed segment and active matrix displays according to the invention;

FIG. 3 is a cross section of the substrate of FIG. 2 with a grid added; and

DESCRIPTION OF THE INVENTION

Figure 4:
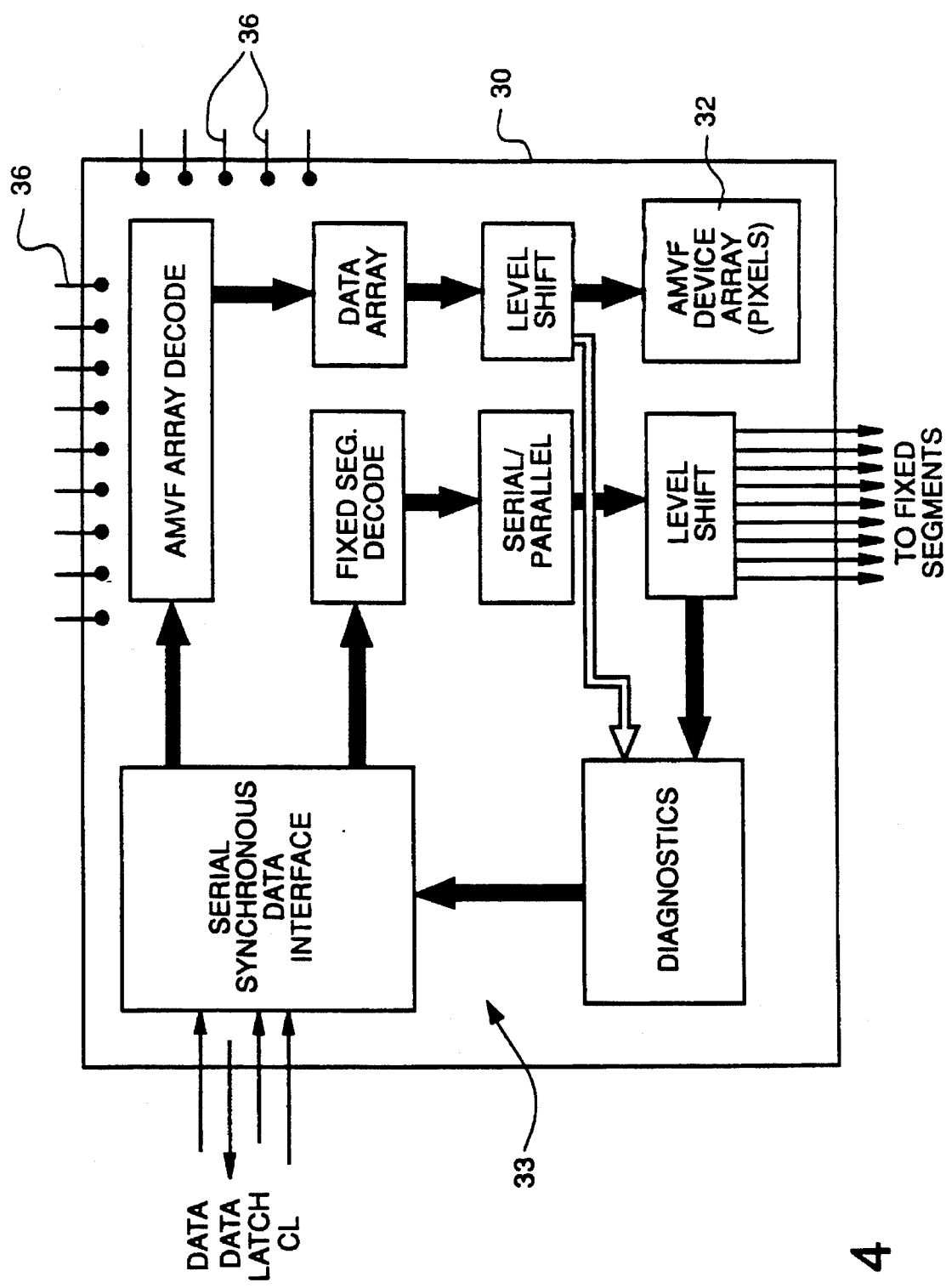
FIG. 4 is a block diagram of the driving and interface circuits according to the invention.

FIG. 1 illustrates in cross section a typical vacuum fluorescent display 10 and attendant power and control circuitry. The VF display 10 comprises a tube or envelope 12 containing a plurality of anodes 14, a grid 16 and a filament 18. As is well known, the filament 18 is a thin tungsten wire coated with an oxide material for the thermal emission of electrons when the wire is sufficiently heated. The grid 16 is an electrode which controls the thermal electrons emitted from the filament. It is positioned between the filament 18 and the anode 14. When the grid 16 is positive relative to the filament, electrons from the filament are accelerated toward the anode. The control asserted by the grid also enhances light emission uniformity by preventing hot spots directly beneath the filament wire. The anode is comprised of conductive elements coated with a phosphor in a desired pattern. When the grid and the anode elements are positive, the thermal electrons collide with the phosphor to cause light emission. Thus by controlling the voltage on the anode elements and grid, the anode elements may be selectively illuminated. To assure that there is no light emission when not desired, an anode element (for selective control) or grid (for controlling all anode elements) is impressed with a voltage below a cutoff level, which may be the filament voltage or lower. The envelope 12 comprises a flat glass substrate 20 and a top glass 22 spaced from the substrate by a glass frit sealer 24 which comprises the sides of the envelope. A lead frame 26 containing outwardly projecting pins 28 is mounted on the lower substrate 20 and extends through the sealer 24. Each pin is coupled to a conductive trace (not shown) to an anode element 14 and provides a connection point for external control circuitry. The anode elements, when illuminated, emit light through the top glass for direct viewing or projection through a HUD system.

In accordance with the invention, a hybrid VFD includes all the elements of the FIG. 1 structure except for traces connecting each pin to an anode element. The hybrid display, as shown in FIGS. 2 and 3, has fixed anode elements or segments 14 supported directly on the glass substrate 20, and a silicon substrate 30 containing an active matrix VFD 32 is mounted by epoxy adhesive 34 on the substrate 20. Driver and interface circuits 33 are also embodied on the silicon substrate 30 and provide signals for selective voltage application to the fixed segments 14 and to the pixels of the AMVFD 32. Pins 28 carrying power and data signals from external circuitry to the display are fixed along the envelope periphery. The pins 28 as well as the fixed segments 14 are connected to circuitry on the silicon substrate 30 by aluminum traces 38 on the glass substrate 20 which extend to the edge of the silicon substrate, and by wire bonds 36 which connect each trace 38 to a corresponding bonding pad on the silicon substrate.

The driver and interface circuits on the silicon substrate as shown in FIG. 4 comprise a serial synchronous data interface and controls for each of the fixed segment and the active matrix anodes. The serial interface has serial data in and data out pin, a latch pin and a serial clock pin. Another type of controller interface could be used but the serial interface is the minimum circuit required to carry out the necessary functions. A fixed segment decode circuit receiving data over the serial interface determines which segments shall be illuminated and a serial/parallel circuit outputs parallel segment energization signals to the fixed segments. The energization signals are elevated to a suitable voltage by a level shift circuit to achieve the desired illumination intensity. Outputs from the level shift circuit are applied to a diagnostic circuit which monitors the signals to verify that the outputs are consistent with the commanded illumination pattern, and the diagnostic circuit output is directed to the serial interface. An AMVF array decode circuit under control of the serial interface determines which pixels of the reconfigurable display shall be illuminated, and a data array memory circuit stores the state of each pixel. Energization signals are applied by another level shift circuit to those pixels of the AMVF array to be illuminated. Signal outputs from that level shift circuit are fed to the diagnostic circuit to monitor the array energization signals.

The pins required for the display envelope, in addition to the four serial interface pins already mentioned, include eight pins for filaments, one pin for fixed segment display grid, one pin for AMVFD coplanar grid, one pin for ground, one pin for logic level power supply, and one pin for high level voltage. Thus fewer than 20 pins will suffice, compared to more than 200 pins for a 40 by 64 pixel AMVFD alone. This low pin count removes the pin limitation to size reduction, making the VF display technology more attractive from the standpoint of packaging for HUD applications and of economy. Moreover, by including the level shifting function in the vacuum tube, the external supply circuitry is reduced.

The embodiments of the invention in which an exclusive property or privilege is claimed are defined as follows:

1. A vacuum fluorescent display having, in combination, a reconfigurable display portion and a fixed segment portion, comprising:

a vacuum fluorescent display tube having anode and cathode elements, and intermediate control grids;

a mounting surface of the tube supporting a silicon substrate and a fixed segment anode array on the mounting surface spaced from the silicon substrate;

the silicon substrate containing an active matrix anode array and an interface circuit; and the interface circuit having an input for receiving external control signals and an output including a first driver circuit coupled to the active matrix anode array and a second driver circuit coupled to the fixed segment anode array for activating the display.

2. The invention as defined in claim 1 wherein:

the input of the interface circuit includes a serial data input for receiving display commands; and the mounting surface includes input terminals connected to the serial data input of the interface circuit for coupling external display commands to the display.

3. The invention as defined in claim 1 wherein the interface circuit comprises:

a serial data input device;

means for decoding serial data input signals to establish anode energization signals; and level shift means comprising the driver circuits for outputting sufficient voltage to drive the anode arrays.

4. The invention as defined in claim 3 wherein the first driver circuit produces a first voltage for activating the active matrix display and the second driver circuit produces a second voltage for activating the fixed segment display.

5. The invention as defined in claim 1 wherein:

the mounting surface is a glass plate having marginal terminals for coupling external signals to the display;

conductive traces on the glass plate extending between the terminals and the substrate, and between the fixed segment array and the substrate; and wire bonds connecting the traces to the interface circuit on the substrate.

\* \* \* \* \*